United States Patent
Lee et al.

(10) Patent No.: US 11,292,314 B2
(45) Date of Patent: Apr. 5, 2022

(54) AIR-CONDITIONING CONTROL SYSTEM AND CONTROL METHOD FOR VEHICLE

(71) Applicants: HYUNDAI MOTOR COMPANY, Seoul (KR); KIA MOTORS CORPORATION, Seoul (KR)

(72) Inventors: Sang Shin Lee, Suwon-si (KR); Man Ju Oh, Yongin-si (KR); So La Chung, Seoul (KR); Jae Woong Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 90 days.

(21) Appl. No.: 16/669,713

(22) Filed: Oct. 31, 2019

(65) Prior Publication Data

US 2021/0008959 A1    Jan. 14, 2021

(30) Foreign Application Priority Data

Jul. 11, 2019   (KR) .......................... 10-2019-0084025

(51) Int. Cl.
*B60H 1/00* (2006.01)

(52) U.S. Cl.
CPC ................. *B60H 1/00742* (2013.01)

(58) Field of Classification Search
CPC ............ B60H 1/00742; B60H 1/00978; B60H 1/00778; B60H 1/00007; B60H 1/00792; B60H 1/24; B60H 1/00814; B60H 1/00985; B60N 2/002
See application file for complete search history.

(56) References Cited

U.S. PATENT DOCUMENTS

| | | | | |
|---|---|---|---|---|
| 5,222,661 A * | 6/1993 | Wenhart | ............ | B60H 1/00735 236/49.3 |
| 5,465,589 A * | 11/1995 | Bender | ................ | B60H 1/3208 123/41.12 |
| 5,966,070 A * | 10/1999 | Thornton | ............... | G08B 21/22 340/425.5 |
| 6,104,293 A * | 8/2000 | Rossi | ..................... | B60N 2/002 340/425.5 |
| 6,626,003 B1* | 9/2003 | Kortum | ............. | B60H 1/00428 62/235.1 |
| 6,662,572 B1* | 12/2003 | Howard | ............. | B60H 1/00264 62/235.1 |

(Continued)

FOREIGN PATENT DOCUMENTS

KR   10-0858193   9/2008

*Primary Examiner* — Ljiljana V. Ciric
(74) *Attorney, Agent, or Firm* — Mintz Levin Cohn Ferris Glovsky and Popeo, P.C.; Peter F. Corless

(57) ABSTRACT

An air-conditioning control system for a vehicle includes: an occupant sensing unit that determines whether or not there is an occupant inside the vehicle when a driver exits from the vehicle; a ventilation control unit that performs control to allow external air to be introduced into the vehicle, upon sensing that there is an occupant in the vehicle; and a temperature control unit that senses at least one of an interior temperature of the vehicle and an external temperature at the time of controlling ventilation. The system is configured to control heating or cooling based on the sensed interior temperature or the external temperature.

6 Claims, 4 Drawing Sheets

(56) References Cited

U.S. PATENT DOCUMENTS

| | | | | |
|---|---|---|---|---|
| 6,751,544 B2* | 6/2004 | Hashimoto | F02D 11/107 | 123/399 |
| 6,812,844 B1* | 11/2004 | Burgess | B60N 2/002 | 180/273 |
| 6,922,147 B1* | 7/2005 | Viksnins | B60N 2/002 | 340/573.1 |
| 6,922,622 B2* | 7/2005 | Dulin | B06B 1/0215 | 180/272 |
| 6,926,601 B2* | 8/2005 | Aoki | A61L 9/16 | 454/121 |
| 6,946,621 B1* | 9/2005 | Roseman | B60B 39/025 | 219/202 |
| 6,998,988 B1* | 2/2006 | Kalce | B60N 2/002 | 340/457.1 |
| 7,123,157 B2* | 10/2006 | Best | B60N 2/002 | 340/666 |
| 7,378,979 B2* | 5/2008 | Rams, Jr. | B60N 2/002 | 180/271 |
| 7,472,554 B2* | 1/2009 | Vosburgh | B60H 1/00742 | 236/94 |
| 7,710,277 B2* | 5/2010 | Wilson | G08B 21/24 | 340/573.1 |
| 7,714,737 B1* | 5/2010 | Morningstar | G08B 21/24 | 340/667 |
| 8,058,983 B1* | 11/2011 | Davisson | B60N 2/002 | 340/457 |
| 8,232,874 B1* | 7/2012 | Aneiros | B60H 1/00657 | 340/438 |
| 9,202,316 B1* | 12/2015 | Trudell | B60H 1/00742 | |
| 9,227,484 B1* | 1/2016 | Justice | B60H 1/00742 | |
| 9,378,641 B2* | 6/2016 | Beumler | B60N 2/002 | |
| 9,434,275 B2* | 9/2016 | Maley | B60N 2/002 | |
| 9,457,716 B2* | 10/2016 | Westmoreland | B60J 1/17 | |
| 9,539,983 B2* | 1/2017 | Demeritte | G08B 21/24 | |
| 9,770,962 B2* | 9/2017 | Quave | G08B 21/24 | |
| 9,773,401 B1* | 9/2017 | Auvenshine | H04W 76/10 | |
| 9,789,786 B2* | 10/2017 | Westmoreland | B60N 2/002 | |
| 9,809,085 B1* | 11/2017 | Pierce | B60H 1/00985 | |
| 9,852,601 B1* | 12/2017 | Auvenshine | A61B 5/02438 | |
| 9,937,830 B1* | 4/2018 | Curry, V | B60N 2/879 | |
| 9,953,230 B2* | 4/2018 | Nicol | B60R 1/00 | |
| 9,975,400 B2* | 5/2018 | Farooq | B60H 1/00771 | |
| 9,995,232 B2* | 6/2018 | Khafagy | F02N 11/0818 | |
| 10,004,111 B2* | 6/2018 | Nakashima | B60H 1/2227 | |
| 10,040,422 B2* | 8/2018 | Demeritte | B60R 22/48 | |
| 10,052,936 B2* | 8/2018 | Prakah-Asante | B60H 1/00807 | |
| 10,054,096 B2* | 8/2018 | Berkson | B60H 1/008 | |
| 10,093,151 B2* | 10/2018 | Baker | B60H 1/00792 | |
| 10,163,316 B2* | 12/2018 | Roisen | G08B 21/0266 | |
| 10,183,546 B2* | 1/2019 | Whitens | G01J 5/026 | |
| 10,232,680 B2* | 3/2019 | Park | B60H 1/00849 | |
| 10,272,737 B2* | 4/2019 | Stanek | B60H 1/00849 | |
| 10,272,742 B2* | 4/2019 | Chavez Hernandez | B60K 37/02 | |
| 10,272,807 B2* | 4/2019 | Dudar | B60H 1/00742 | |
| 10,276,016 B2* | 4/2019 | Mattarocci | B60N 2/002 | |
| 10,289,288 B2* | 5/2019 | Penilla | H04L 67/12 | |
| 10,300,763 B2* | 5/2019 | Park | B60H 1/00885 | |
| 10,351,102 B2* | 7/2019 | Park | B60R 25/1001 | |
| 10,438,479 B1* | 10/2019 | Guidotti | B60Q 1/50 | |
| 10,558,876 B2* | 2/2020 | Naka | B60W 40/08 | |
| 10,780,825 B1* | 9/2020 | Nathan | G08B 21/22 | |
| 10,952,282 B2* | 3/2021 | Ghannam | H05B 3/0014 | |
| 11,110,832 B2* | 9/2021 | Da Costa | B60N 2/976 | |
| 11,124,194 B2* | 9/2021 | Miura | B60H 1/00985 | |
| 11,155,140 B2* | 10/2021 | Chen | B60H 1/00742 | |
| 11,155,141 B2* | 10/2021 | Chen | B60H 1/00742 | |
| 11,170,631 B2* | 11/2021 | Hunter, Jr. | B60N 2/2866 | |
| 2002/0066281 A1* | 6/2002 | Gunasekera | B60H 1/00828 | 62/186 |
| 2002/0161501 A1* | 10/2002 | Dulin | B60H 1/00814 | 701/45 |
| 2003/0122662 A1* | 7/2003 | Quinonez | B60N 2/002 | 340/457 |
| 2003/0132838 A1* | 7/2003 | Toles | G08B 21/24 | 340/457 |
| 2004/0110459 A1* | 6/2004 | Snow | B60H 1/00428 | 454/137 |
| 2006/0273917 A1* | 12/2006 | Rams | B60N 2/002 | 340/667 |
| 2006/0290518 A1* | 12/2006 | Bingle | G08B 13/19 | 340/573.1 |
| 2007/0015451 A1* | 1/2007 | McGrath | B60H 1/00742 | 454/75 |
| 2007/0051491 A1* | 3/2007 | Moultanovsky | B60H 1/00007 | 165/42 |
| 2008/0125941 A1* | 5/2008 | Mitteer | B60H 1/00978 | 701/46 |
| 2009/0130965 A1* | 5/2009 | Galvez-Ramos | B60H 1/00428 | 454/75 |
| 2009/0204297 A1* | 8/2009 | Friedman | B60H 1/00742 | 701/46 |
| 2009/0286459 A1* | 11/2009 | Major | B60H 1/00778 | 454/75 |
| 2010/0100306 A1* | 4/2010 | Gamache | F02N 11/0803 | 701/113 |
| 2012/0089299 A1* | 4/2012 | Breed | B60N 2/888 | 701/36 |
| 2013/0144470 A1* | 6/2013 | Ricci | G06F 11/2023 | 701/2 |
| 2015/0019226 A1* | 1/2015 | Gazdzinski | G06F 21/44 | 704/254 |
| 2015/0273975 A1* | 10/2015 | Kim | B60H 1/248 | 454/139 |
| 2015/0286882 A1* | 10/2015 | Nicol | G06K 9/00838 | 348/148 |
| 2015/0306940 A1* | 10/2015 | Salter | B60J 7/0573 | 701/49 |
| 2016/0042624 A1* | 2/2016 | Quave | B60H 1/00778 | 340/457 |
| 2016/0082923 A1* | 3/2016 | Gavriel | G08B 21/22 | 340/438 |
| 2016/0090958 A1* | 3/2016 | Berkson | B60H 1/00978 | 701/112 |
| 2016/0167479 A1* | 6/2016 | Morin | G01N 33/004 | 701/48 |
| 2016/0272112 A1* | 9/2016 | DeGrazia | B60Q 9/00 | |
| 2016/0318368 A1* | 11/2016 | Alger | G01C 21/3453 | |
| 2017/0043783 A1* | 2/2017 | Shaw | B60N 2/28 | |
| 2018/0023493 A1* | 1/2018 | Khafagy | F16H 63/50 | 477/98 |
| 2018/0065504 A1* | 3/2018 | Lan | G08B 21/0283 | |
| 2019/0001793 A1* | 1/2019 | Zeidan | B60J 1/2069 | |
| 2020/0064444 A1* | 2/2020 | Regani | G01S 7/415 | |

* cited by examiner

FIG. 2

| OCCUPANT SENSING | OPENING DEGREE OF DUCT DOOR OF REAR DUCT | AIR CONDITIONING LEVEL AT REAR SEAT |
|---|---|---|
| --- | Closed | --- |
| ○ | Small | LOW |
| ○○ | Intermediate | MIDDLE |
| ○○○ | Full | HIGH |

AIR-CONDITIONING CONTROL SYSTEM AND CONTROL METHOD FOR VEHICLE

CROSS REFERENCE TO RELATED APPLICATION

The present application claims priority to and the benefit of Korean Patent Application No. 10-2019-0084025, filed Jul. 11, 2019, the entire contents of which is incorporated herein by reference.

FIELD

The present disclosure relates to an air-conditioning control system and control method for a vehicle, and more particularly, to a technique for sensing an occupant in a vehicle and automatically controlling air conditioning in a parked vehicle.

BACKGROUND

The statements in this section merely provide background information related to the present disclosure and may not constitute prior art.

A rear occupant alert (ROA) function, which is one of the safety options for a vehicle, is a technique for sensing whether an occupant is neglected in a rear seat by sensing a movement in the rear seat using an ultrasonic sensor when the vehicle is parked.

In particular, the technique is for preventing a safety accident by generating a rear seat check message in a cluster when the vehicle is parked, and generating a warning sound or sending a notification message to a driver by sensing whether or not there is an occupant on the rear seat when the driver exits from the vehicle.

In spite of such a safety device, when the driver does not recognize an occupant who is neglected in a rear seat or when no help can be provided to an occupant who is neglected in a rear seat by a person around the vehicle, there is a possibility that the occupant who is neglected on the rear seat may have a safety accident.

The contents described as the related art have been provided only to assist in understanding the background of the present disclosure and should not be considered as corresponding to the related art known to those having ordinary skill in the art.

SUMMARY

An object of the present disclosure is to provide a technique for automatically controlling air conditioning in a parked vehicle, when no response is made by a driver in spite of a rear occupant alert.

In one form of the present disclosure, an air-conditioning control system for a vehicle includes: an occupant sensing unit configured to determine whether or not there is an occupant inside the vehicle when a driver exits from the vehicle; a ventilation control unit configured to perform control to allow external air to be introduced into the vehicle, upon sensing that there is an occupant in the vehicle; and a temperature control unit configured to sense at least one of an interior temperature of the vehicle or an external temperature at the time of controlling ventilation, and to control heating or cooling based on the sensed indoor temperature or external temperature.

In some implementations, the air-conditioning control system for a vehicle may further include an ultrasonic sensor configured to sense a movement inside the vehicle, and the occupant sensing unit may determine that there is an occupant if the movement is sensed by the ultrasonic sensor.

In some implementations, the ultrasonic sensor may be provided at least as many times as a number of rear seats in the vehicle to sense a movement in each of the seats, and the occupant sensing unit may sense a location of an occupant or the number of occupants.

In some implementations, at least one of the ventilation control unit or the temperature control unit may control an airflow direction or an airflow volume of the external air to be introduced, or may control a heating level or a cooling level, based on the sensed location of the occupant or the sensed number of occupants.

In some implementations, the ventilation control unit may use a blower to allow the external air to be introduced in the interior, and control an opening degree of a duct door that is located in a rear duct connected from the blower to the rear seats based on the number of occupants on the rear seats.

The temperature control unit may sense an indoor temperature, control cooling if the sensed indoor temperature is higher than a preset safety temperature range, and control heating if the sensed indoor temperature is lower than the preset safety temperature range.

The air-conditioning control system for a vehicle may further include an alarm providing unit providing a danger signal to the driver or a person around the vehicle if it is sensed by the occupant sensing unit that there is an occupant, and the ventilation control unit or the temperature control unit may allow the external air to be introduced or control heating or cooling, when a preset danger time has elapsed after the danger signal is provided by the alarm providing unit.

In another form of the present disclosure, an air-conditioning control method for a vehicle includes: determining whether or not there is an occupant inside the vehicle when a driver exits from the vehicle; performing control to allow external air to be introduced into the vehicle, if it is sensed that there is an occupant; and sensing an interior temperature of the vehicle or an external temperature, and controlling heating or cooling based on the sensed interior temperature or external temperature.

The air-conditioning control method for a vehicle may further include determining whether or not the vehicle is parked, before the determining of whether or not there is an occupant. In the determining of whether or not there is an occupant, it may be determined whether or not there is an occupant when a preset sensing time has elapsed in the state in which it is determined that the vehicle is parked.

In the determining of whether or not there is an occupant, when an ultrasonic sensor senses a movement inside the vehicle, it may be determined that there is an occupant.

In the determining of whether or not there is an occupant, the ultrasonic sensor provided at least as many as the number of rear seats in the vehicle may sense a movement in each of the seats, thereby sensing a location of an occupant or the number of occupants. In the performing of the control to allow introduction of the external air, a blower may be used to control an airflow direction or an airflow volume of the external air to be introduced based on the sensed location of the occupant or the sensed number of occupants.

In the performing of the control to allow introduction of the external air, an opening degree of a duct door that is located in a rear duct connected from the blower to the rear seats may be controlled based on the number of occupants on the rear seats.

In the controlling of the heating or cooling, an indoor temperature may be sensed, cooling may be controlled if the sensed indoor temperature is higher than a preset safety temperature range, and heating may be controlled if the sensed indoor temperature is lower than the preset safety temperature range.

In the determining of whether or not there is an occupant, the ultrasonic sensor provided at least as many as the number of rear seats in the vehicle may sense a movement in each of the seats, thereby sensing the number of occupants. In the performing of the control to allow introduction of the external air, a cooling level or a heating level may be controlled based on the sensed number of occupants.

The air-conditioning control method for a vehicle may further include providing a danger signal to the driver or a person around the vehicle if it is sensed that there is an occupant, after the determining of whether or not there is an occupant. When a preset danger time has elapsed after the danger signal is provided, the external air is introduced, or the heating or cooling may be controlled.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a table illustrating an opening degree of a duct door depending on the number of occupants in rear seats.

Figure 1:
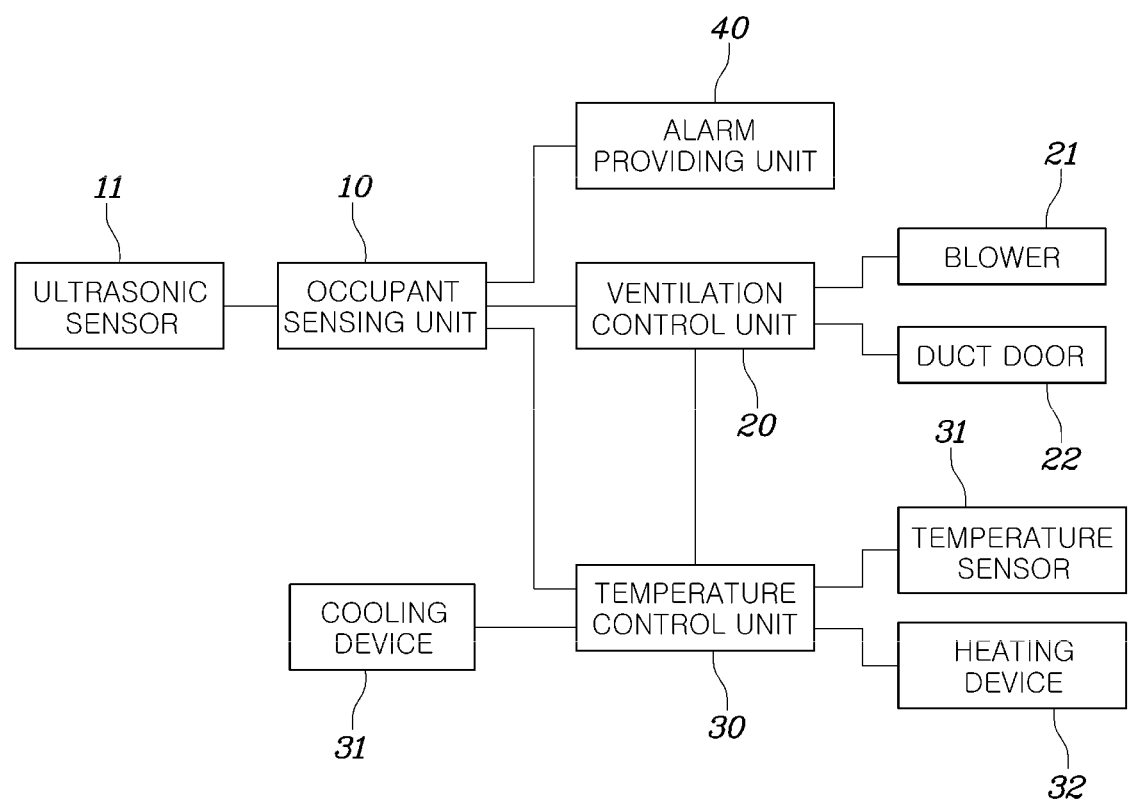
FIG. 1 illustrates a configuration diagram of one form of an air-conditioning control system for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural or functional descriptions of embodiments and implementations of the present disclosure disclosed in the present specification or application are merely given for the purpose of describing embodiments and implementations according to the present disclosure. Embodiments and implementations according to the present disclosure may be implemented in various forms and are not to be construed as being limited to the embodiments described in the present specification or application.

Since embodiments and implementations according to the present disclosure may be modified in various ways and take on various alternative forms, particular embodiments and implementations will be illustrated in the drawings and described in detail in the present specification or application. However, there is no intent to limit embodiments and implementations according to the concept of the present disclosure to the particular forms disclosed, and the present disclosure should be construed as covering all modifications, equivalents, and alternatives included in the spirit and technical scope of the present disclosure.

It should be understood that, although the terms "first", "second", and the like may be used herein to describe various elements, the elements are not limited by the terms. The terms are used only for the purpose of distinguishing one element from another element. For example, the first element may be named the second element, and also the second element may similarly be called the first element, without departing from the scope according to the concept of the present disclosure.

When a certain element is referred to as being "connected" or "coupled" to another element, the certain element may be directly connected or coupled to the other element, but it should be understood that another intervening element may exist therebetween. On the other hand, when a certain element is referred to as being "directly connected" or "directly coupled" to another element, it should be understood that no intervening element exists therebetween. Other expressions for describing relationship between elements, i.e. "between", "directly between", "adjacent to", "directly adjacent to", and the like, should also be construed in the same manner.

Terms used in the present specification are used only for describing specific embodiments, and not intended to limit the present disclosure. Unless the context clearly indicates otherwise, singular expressions include plural expressions. It should be further understood that the term "include", "have", or the like in the present specification is used to denote the existence of the stated features, numbers, steps, operations, elements, parts, or combinations thereof, while not precluding the existence or addition of one or more other features, numbers, steps, operations, elements, parts, or combinations thereof.

Unless defined otherwise, all terms used herein, including technical and scientific terms, have the same meaning as commonly understood by those having ordinary skill in the art to which the present disclosure pertains. Terms such as those defined in generally used dictionaries should be interpreted to have meanings consistent with the contextual meanings in the relevant art, and are not to be interpreted to have ideal or excessively formal meanings unless clearly defined in the present specification.

Hereinafter, the present disclosure will be described in detail by describing embodiments and implementations of the present disclosure with reference to the accompanying drawings. Identical reference marks shown in each drawing are used to denote identical elements.

An air conditioner for a vehicle, which is capable of, for example, adjusting an indoor temperature to a desired level even when outdoor conditions, such as winter and summer, are changed, and removing moisture or frost on front glass, is one of the indispensable and convenient facilities of the vehicle.

The air conditioner may affect seats not only in a first row but also in a second or third row, thereby providing indoor comfort not only for occupants on the seats in the first row but also for occupants on the seats in second or third row.

FIG. 1 illustrates a configuration diagram of one form of an air-conditioning control system for a vehicle.

Referring to FIG. 1, the air-conditioning control system for a vehicle includes: an occupant sensing unit 10 determining whether or not there is an occupant inside the vehicle when a driver exits from the vehicle; a ventilation control unit 20 performing control to allow external air to be introduced into the vehicle, if it is sensed that there is an occupant in the vehicle; and a temperature control unit 30 sensing an indoor temperature of the vehicle (also known as an interior temperature of the vehicle) or an external temperature at the time of controlling ventilation, and controlling heating or cooling based on the sensed indoor temperature or external temperature.

The occupant sensing unit 10 may determine whether or not there is an occupant inside the vehicle using a sensor.

In particular, the occupant sensing unit 10 may determine whether or not any occupant is still inside the vehicle when the vehicle is parked. In some implementations, the occupant sensing unit 10 may determine whether or not the vehicle is parked, and whether or not there is an occupant when a preset sensing time has elapsed after the vehicle is parked. The sensing time may be preset as, for example, 10 minutes.

It may be determined whether or not the vehicle is parked by sensing termination of operation of the vehicle, termination of operation of an engine, door locking, separation of a vehicle key, running of a parking brake, or the like.

The occupant sensing unit 10 may determine whether or not there is an occupant by sensing a movement indoors using an ultrasonic sensor 11, as will described below. Particularly, a movement of a child, a dog, or the like may be sensed.

In other implementations, a heat sensor may be used to sense a body temperature, or a pressure sensor or the like may be used to sense a weight of a seat, thereby determining whether or not there is an occupant.

In yet other implementations, a sensor for measuring a frequency, such as a radar sensor or a lidar sensor, may be used to sense a movement inside the vehicle, thereby determining whether or not there is an occupant.

In addition, the present disclosure mainly describes a case in which it is sensed whether or not there is an occupant who is located in a rear seat (in a second, third, or further rear row), but the same can be applicable to sense whether or not there is an occupant on a passenger seat in a first row.

The ventilation control unit 20 may perform a control to allow the external air to be introduced into the vehicle, if it is sensed that there is an occupant.

In some implementations, the air conditioner for the vehicle may be converted into an external air mode in which the external air is introduced into the vehicle interior, and a blower 21 may be driven to introduce the external air indoors.

In other implementations, the external air may be introduced into the vehicle interior through a control by, for example, opening a door of the vehicle or opening a window of the vehicle.

The temperature control unit 30 may control ventilation and simultaneously control an interior temperature of the vehicle. The temperature control unit 30 may sense an interior temperature of the vehicle or sense a temperature of the external air introduced into the interior from the outside to control the indoor temperature of the vehicle.

In some implementations, a temperature sensor 31 may be located outside the vehicle to sense a temperature outside the vehicle. In other implementations, the temperature sensor 31 may be located inside the vehicle to sense an indoor temperature of the vehicle.

Specifically, the temperature control unit 30 may be connected to a cooling device 31 and a heating device 32 to control an indoor temperature of the vehicle. The cooling device 31 may be an air conditioner including a compressor, an expander, an evaporation core, and the like. The heating device 32 may be a heater including a heating core and the like.

Accordingly, it is possible to protect an occupant such as a child or a dog from the lack of oxygen indoors or the heat or cold caused when the occupant is kept inside a locked vehicle.

The occupant sensing unit 10, the ventilation control unit 20, and the temperature control unit 30 may be implemented through a non-volatile memory (not shown) that is configured to store data associated with algorithms configured to control the operations of various elements of the vehicle or software instructions for reproducing the algorithm and a processor (not shown) configured to perform the operations which will be described below using the data stored in the memory. Here, the memory and the processor may be implemented as separate chips. Alternatively, the memory and the processor may be implemented as an integrated single chip. The processor may be in the form of one or more processors.

In some implementations, the ventilation control unit 20 and the temperature control unit 30 may be included in an air-conditioning controller 3 of the vehicle, for example, a full automatic temperature control (FATC) unit.

More specifically, the air-conditioning control system for a vehicle further includes an ultrasonic sensor 11 sensing a movement inside the vehicle, and the occupant sensing unit 10 may determine that there is an occupant, if the movement is sensed by the ultrasonic sensor 11.

The ultrasonic sensor 11 is a sensor using characteristics of ultrasonic waves, which are sounds at a frequency (about 20 KHz or more) that is high enough to be inaudible to a human ear, and may generate ultrasonic waves to detect a distance, a thickness, or a movement.

In particular, the ultrasonic sensor 11 may be located at a front portion inside the vehicle, and may be installed to sense a movement in a rear seat of the vehicle.

More specifically, the ultrasonic sensor 11 is provided at least as many as the number of rear sheets in the vehicle, and the ultrasonic sensor 11 may sense a movement in each of the seats. The occupant sensing unit 10 may sense a location of an occupant or the number of occupants.

In some implementations, when the number of rear seats (in a second row) in the vehicle is three, three ultrasonic sensors 11 may be provided to sense a movement in the respective seats. Accordingly, the occupant sensing unit 10 may sense a location of an occupant and the number of occupants.

As a result, the ventilation control unit 20 or the temperature control unit 30 may control an airflow direction or an airflow volume of the external air to be introduced, or may control a heating level or a cooling level, based on the sensed location of the occupant or the sensed number of occupants.

In some implementations, the ventilation control unit 20 may perform a control to direct the airflow toward the sensed location of the occupant according to the sensed location of the occupant, to open a window adjacent to the sensed location of the occupant, or to do the like.

In other implementations, the ventilation control unit 20 may change the airflow volume according to the sensed number of occupants. That is, the more sensed occupants, the greater airflow volume by increasing the number of rotations of a blower 21 or increasing an opening degree of the window.

More specifically, the ventilation control unit 20 may allow the external air to be introduced indoors by using the blower 21, and control an opening degree of a duct door 22 that is located in a rear duct connected from the blower 21 to the rear seats based on the number of occupants on the rear seats.

In the air conditioner according to some implementations of the present disclosure, the external air having passed through an air filter may be introduced to the vehicle interior by the blower 21 and supplied to the vehicle interior through the duct. In particular, the duct includes a rear duct connected to the rear seats of the vehicle, and a duct door 22 may be located in the rear duct to adjust an airflow volume of the external air introduced into the rear duct.

FIG. 2 is a table illustrating an opening degree of the duct door 22 depending on the number of occupants in rear seats.

Referring further to FIG. 2, the ventilation control unit 20 may control an airflow volume of external air to be provided to a rear seat by controlling the opened degree of the duct door 22.

If there is no occupant in the rear seat, there is no need to provide external air to the rear seat and the duct door 22 may not be opened. If there is an occupant on the rear seat, however, the duct door 22 may be opened to supply external air, and the opened degree of the duct door 22 may be controlled to be increased so as to be proportional to the number of occupants on the rear seats.

In some implementations, the temperature control unit 30 may control a heating level or a cooling level based on the sensed number of occupants. It may be determined that the more sensed occupants, the greater thermal load. Accordingly, the temperature control unit 30 may increase a cooling level as the sensed number of occupants is larger.

In other implementations, the temperature control unit 30 may sense an indoor temperature, control cooling if the sensed indoor temperature is higher than a preset safety temperature range, and control heating if the sensed indoor temperature is lower than the preset safety temperature range.

The preset safety temperature range may be a temperature range in which occupants feel comfortable, or may be a temperature range which has no problem in safety even at the time of exposure to an occupant for a long time. For example, the preset safety temperature range may be 15° C. to 25° C.

The air-conditioning control system for a vehicle may further include an alarm providing unit 40 providing a danger signal to the driver or a person around the vehicle upon sensing by the occupant sensing unit 10 that there is an occupant, and the ventilation control unit 20 or the temperature control unit 30 may allow introduction of external air or control heating or cooling when a preset danger time has elapsed after the danger signal is provided by the alarm providing unit 40.

The alarm providing unit 40 may provide a danger signal to the driver or a person around the vehicle upon sensing by the occupant sensing unit 10 that there is an occupant. The alarm providing unit 40 may provide a danger signal to a person around the vehicle by honking a horn of the vehicle, flickering an emergency light of the vehicle, or doing the like, or may provide a danger signal to the driver by sending a text message or a pop-up message to the driver's mobile phone that has been registered to operate in conjunction with a MOZEN system, just in case the driver is far away from the vehicle.

The alarm providing unit 40 may provide a danger signal to the driver through a cluster, a warning sound, or the like when the driver exits from the vehicle when an occupant is in the vehicle.

In some implementations, the ventilation control unit 20 or the temperature control unit 30 may allow introduction of external air or control heating or cooling after the preset danger time has elapsed after the danger signal is provided by the alarm providing unit 40. If no driver's response is made even after the preset danger time has elapsed, the ventilation control unit 20 or the temperature control unit 30 may perform a control to allow introduction of the external air for the occupant who is in the vehicle.

If a driver's response is made within the preset danger time, the ventilation control unit 20 or the temperature control unit 30 may not perform a control. The preset danger time may be, for example, 10 minutes.

In other implementations, the ventilation control unit 20 or the temperature control unit 30 may perform a control to immediately allow introduction of external air once it is sensed that there is an occupant, independently from the provision of the danger signal by the alarm providing unit 40.

Figure 3:
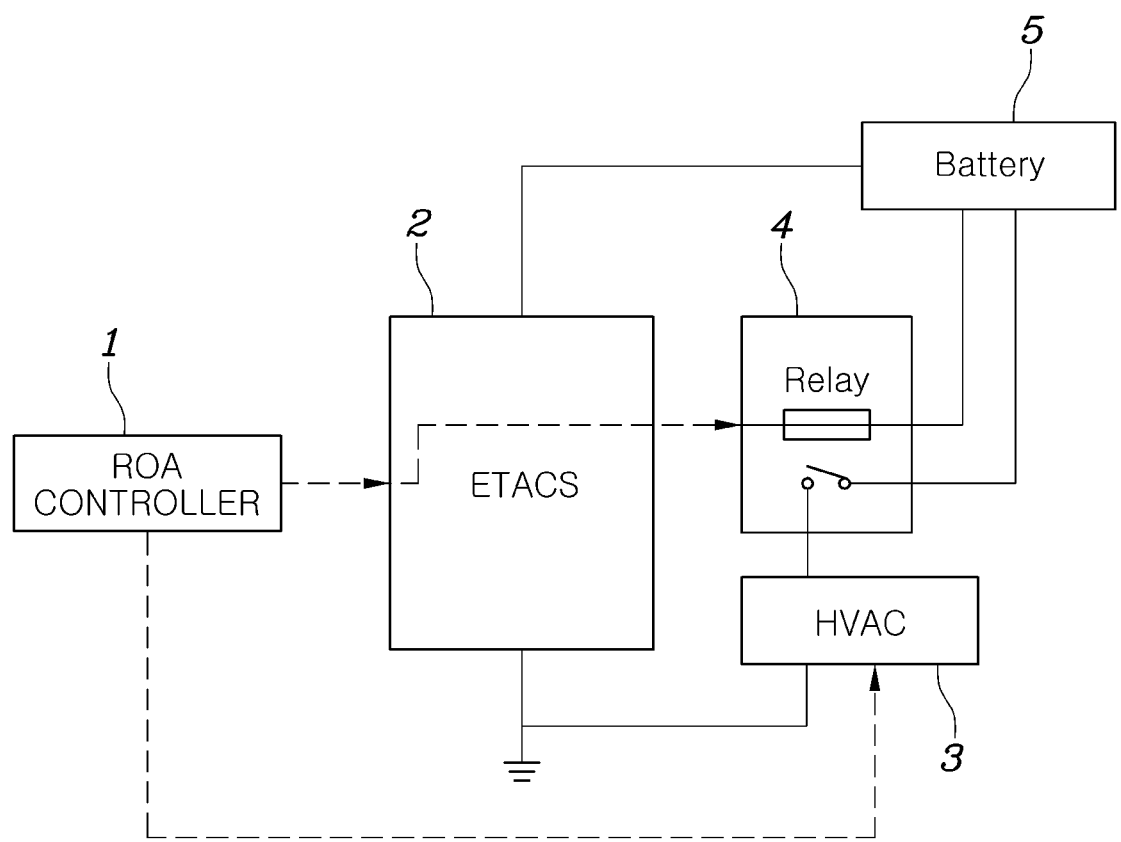
FIG. 3 illustrates a power supply diagram of one form of an air-conditioning control system for a vehicle.

FIG. 3 illustrates one form of a power supply diagram of an air-conditioning control system for a vehicle.

Referring further to FIG. 3, a rear occupant alert (ROA) controller 1 may include the occupant sensing unit 10 that determines whether or not there is an occupant inside a vehicle when a driver exits from the vehicle.

Upon sensing that there is an occupant, the ROA controller 1 may control a relay 4 to supply power from a battery 5 to an electronic time and alarm control system (ETACS) 2 and a heating, ventilating, and air conditioning (HVAC) controller 3 connected with the battery 5, thereby activating the electronic time and alarm control system 2 and the heating, ventilating, and air conditioning controller 3.

The electronic time and alarm control system 2 may include the alarm providing unit 40, and may receive an instruction from the ROA controller 1 and perform a control to generate a danger signal for the driver or a person around the vehicle.

In addition, the heating, ventilating, and air conditioning (HVAC) controller 3 may be a full automatic temperature control (FATC) unit, and may include the ventilation control unit 20 and the temperature control unit 30. The heating, ventilating, and air conditioning controller 3 may receive an instruction from the ROA controller 1 and control the air conditioner to allow air outside the vehicle to be introduced indoors or to control a temperature inside the vehicle.

Here, the air conditioner including a blower 21, a cooling device 31, a heating device 32, and the like may be connected to the battery 5 to be supplied with power. In particular, a compressor or the like of the cooling device 31 may be driven by using power from the battery 5.

When the battery 5 is insufficiently charged or the power supplied from the battery 5 is low, the required power can be generated by turning on the vehicle or turning on a driving motor or an engine.

In case of the heating device 32, when a separate heater is included, coolant may be heated by the heater using the power from the battery 5, but in case of an air conditioning system using the waste heat of the engine or the driving motor without a heater, the coolant may be heated by turning on the engine or the driving motor.

Figure 4:
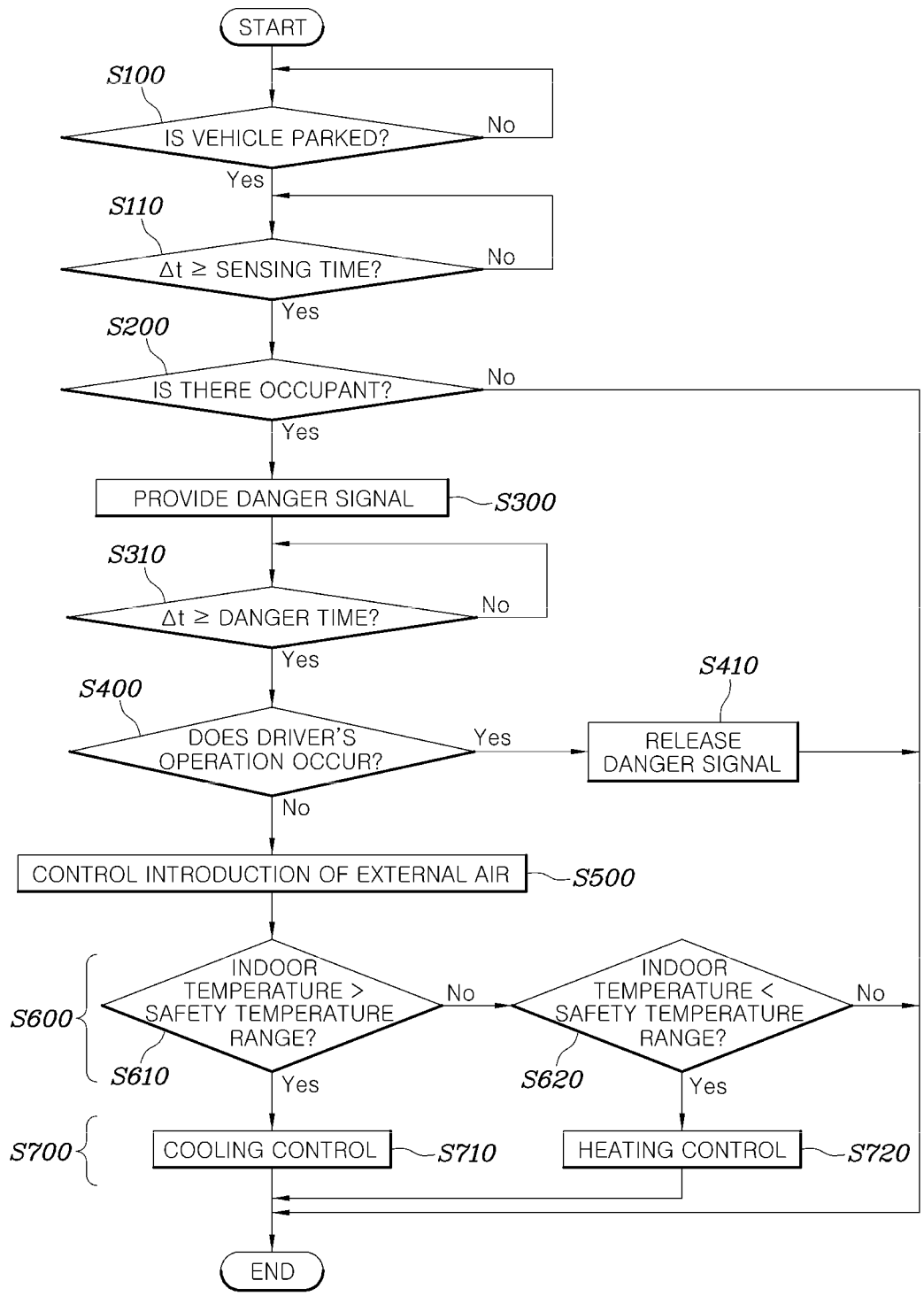
FIG. 4 illustrates a flow chart of one form of an air-conditioning control method for a vehicle.

FIG. 4 illustrates a flow chart of one form of an air-conditioning control method for a vehicle.

Referring further to FIG. 4, one form of an air-conditioning control method for a vehicle includes: determining whether or not there is an occupant inside the vehicle when a driver exits from the vehicle (S200); if it is sensed that there is an occupant in the vehicle, performing control to allow external air to be introduced into the vehicle (S500); and sensing at least one of an interior temperature of the vehicle or an external temperature (S600), and controlling heating or cooling based on the sensed at least one of indoor or external temperature (S700).

Before the determining of whether or not there is an occupant (S200), the air-conditioning control method for a vehicle further includes determining whether or not the vehicle is parked (S100). In the determining of whether or not there is an occupant (S200), it may be determined whether or not there is an occupant when a preset sensing time has elapsed in the state in which it is determined that the vehicle is parked (S110).

When the preset sensing time has elapsed in the state in which the vehicle is parked, it may be determined whether or not there is an occupant (S110).

Specifically, in the determining of whether or not there is an occupant (S200), when the ultrasonic sensor 11 senses a movement inside the vehicle, it may be determined that there is an occupant.

In some implementations, in the determining of whether or not there is an occupant (S200), the ultrasonic sensor 11 provided at least as many as the number of rear seats in the vehicle senses a movement in each of the seats, thereby sensing a location of an occupant or the number of occupants. In the performing of the control to allow introduction of the external air (S500), a blower 21 may be used to control an airflow direction or an airflow volume of the external air to be introduced based on the sensed location of the occupant or the sensed number of occupants.

In particular, in the performing of the control to allow introduction of the external air (S500), an opening degree of a duct door 22 located in a rear duct connected from the blower 21 to the rear seats may be controlled based on the number of occupants on the rear seats.

In the controlling of the heating or cooling (S700), an interior temperature is sensed. If the sensed indoor temperature is higher than a preset safety temperature range (S610), then cooling may be controlled (S710). If the sensed interior temperature is lower than the preset safety temperature range (S620), then heating may be controlled (S720).

In the determining of whether or not there is an occupant (S200), the ultrasonic sensor 11 provided at least as many as the number of rear seats in the vehicle senses a movement in each of the seats, thereby sensing the number of occupants. In the performing of the control to allow introduction of the external air (S500), a cooling level or a heating level may be controlled based on the sensed number of occupants.

In some implementations, after the determining of whether or not there is an occupant (S200), the air-conditioning control method for a vehicle further includes providing a danger signal to the driver or a person around the vehicle, if it is sensed that there is an occupant (S300). When a preset danger time has elapsed after the danger signal is provided (S310), the external air may be introduced (S500), or the heating or cooling may be controlled.

If the driver's operation occurs before the preset danger time after the danger signal is provided (S400), a control may be performed to release the danger signal (S410).

In other implementations, a control may be performed to immediately allow introduction of the external air once it is sensed that there is an occupant, independently from the provision of the danger signal.

According to forms of the air-conditioning control system and control method for a vehicle of the present disclosure, when an occupant is inside a locked vehicle due to drivers carelessness, it is possible to protect an occupant such as a child or a dog from a safety accident caused by the lack of oxygen in the vehicle or the heat or cold.

Accordingly, it is also possible to improve safety of the vehicle and to improve customer satisfaction.

Although the present disclosure has been shown and described with respect to specific embodiments and implementations, it will be apparent to those having ordinary skill in the art that the present disclosure may be variously modified and altered without departing from the spirit and scope of the present disclosure as defined by the following claims.

What is claimed is:

1. An air-conditioning control method for a vehicle, comprising:
   determining whether or not there is an occupant inside the vehicle when a driver exits from the vehicle;
   performing control to allow external air to be introduced into the vehicle, upon sensing that there is an occupant inside the vehicle; and
   sensing at least one of an interior temperature of the vehicle and an external temperature, and controlling heating or cooling based on the at least one of the sensed interior temperature and external temperature,
   wherein in controlling of the heating or cooling, an indoor temperature is sensed, cooling is controlled when the sensed indoor temperature is higher than a preset safety temperature range, and heating is controlled when the sensed indoor temperature is lower than the preset safety temperature range, and
   wherein the vehicle comprises a plurality of the ultrasonic sensors, where the number of ultrasonic sensors of the plurality of ultrasonic sensors is at least equal to the number of rear seats in the vehicle such that a movement in each of the rear seats can be sensed;
   in determining whether or not there is an occupant, the plurality of ultrasonic sensors senses the number of occupants, and
   in performing control to allow introduction of the external air, a cooling level or a heating level is controlled based on the sensed number of occupants.

2. The air-conditioning control method for a vehicle of claim 1, further comprising, before determining whether or not there is an occupant inside the vehicle, determining whether or not the vehicle is parked,
   wherein in determining of whether or not there is an occupant inside the vehicle, whether or not there is an occupant is determined when a preset sensing time has elapsed after determining that the vehicle is parked.

3. The air-conditioning control method for a vehicle of claim 1, wherein in determining whether or not there is an occupant, an occupant is determined to be present when the ultrasonic sensors sense a movement inside the vehicle.

4. The air-conditioning control method for a vehicle of claim 3, wherein:
   in determining whether or not there is an occupant, the plurality of ultrasonic sensors further senses a location of an occupant, and
   in performing the control to allow introduction of the external air, a blower is used to control an airflow direction or an airflow volume of the external air to be introduced based on the at least one of the sensed location of the occupant and the sensed number of occupants.

5. The air-conditioning control method for a vehicle of claim 4, wherein in performing the control to allow introduction of the external air, an opened degree of a duct door that is located in a rear duct connected from the blower to the rear seats is controlled based on the number of occupants in the rear seats.

6. The air-conditioning control method for a vehicle of claim 1, further comprising:
   after determining whether or not there is an occupant, providing a danger signal to the driver or a person around the vehicle upon sensing that there is an occupant,
   wherein when a preset danger time has elapsed after the danger signal is provided, the external air is introduced, or the heating or cooling is controlled.

* * * * *